United States Patent
Rogers et al.

(10) Patent No.: US 9,705,301 B2
(45) Date of Patent: *Jul. 11, 2017

(54) ELECTRICAL DEVICE MOUNTING ASSEMBLY

(71) Applicant: Hubbell Incorporated, Shelton, CT (US)

(72) Inventors: Sean F. Rogers, St. Louis, MO (US); Howard P. Clayton, Festus, MO (US)

(73) Assignee: Hubbell Incorporated, Shelton, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/987,322

(22) Filed: Jan. 4, 2016

(65) Prior Publication Data

US 2016/0118780 A1 Apr. 28, 2016

Related U.S. Application Data

(63) Continuation of application No. 14/146,431, filed on Jan. 2, 2014, now Pat. No. 9,231,392.

(51) Int. Cl.
| | |
|---|---|
| *H05K 7/14* | (2006.01) |
| *H01J 15/00* | (2006.01) |
| *H02G 15/013* | (2006.01) |
| *H02G 3/30* | (2006.01) |
| *F16M 13/02* | (2006.01) |
| *H02G 3/08* | (2006.01) |
| *H02G 3/18* | (2006.01) |

(Continued)

(52) U.S. Cl.
CPC .......... *H02G 15/013* (2013.01); *F16M 13/02* (2013.01); *F16M 13/027* (2013.01); *F21V 21/112* (2013.01); *H02G 3/083* (2013.01); *H02G 3/088* (2013.01); *H02G 3/18* (2013.01); *H02G 3/30* (2013.01); *H02G 15/10* (2013.01); *F21V 21/116* (2013.01)

(58) Field of Classification Search
CPC ............................ H02G 15/013; H02G 15/10
USPC ...................................................... 174/50.51
See application file for complete search history.

(56) References Cited

U.S. PATENT DOCUMENTS

| | | | | |
|---|---|---|---|---|
| 3,342,511 A | * | 9/1967 | Galloway | ................. 285/149.1 |
| 4,894,759 A | * | 1/1990 | Siems | ...................... 362/249.01 |

(Continued)

*Primary Examiner* — Timothy Thompson
*Assistant Examiner* — Rhadames J Alonzo Miller
(74) *Attorney, Agent, or Firm* — Michael Best & Friedrich, LLP

(57) ABSTRACT

An electrical assembly having a support, a mounting member and an electrical device attached to the mounting member and the support. The mounting member is a one piece integrally formed unit having an interior cavity for receiving electrical wires from the power source and supplying the electrical wires to the electrical device. The mounting member has a coupling at a first end of the mounting member with internal threads having an annular recess receiving a seal member for forming a weatherproof seal with the support while allowing limited rotational adjustment of the mounting member with the support and maintaining the weatherproof seal. The mounting member has a second end with a coupling having external threads complementing the internal threads of the first coupling to enable a plurality of the mounting members to be coupled together and forming a weatherproof connection between the adjacent mounting members.

16 Claims, 8 Drawing Sheets

(51) Int. Cl.
*F21V 21/112* (2006.01)
*H02G 15/10* (2006.01)
*F21V 21/116* (2006.01)

(56) References Cited

U.S. PATENT DOCUMENTS

| | | | | |
|---|---|---|---|---|
| 5,169,013 | A * | 12/1992 | Lammens, Jr. | 220/3.2 |
| 5,306,871 | A * | 4/1994 | Lai | 174/70 R |
| 5,414,607 | A * | 5/1995 | Harris et al. | 362/362 |
| 5,510,970 | A * | 4/1996 | Hollenbach et al. | 362/396 |
| 7,695,170 | B1 * | 4/2010 | Baldwin et al. | 362/371 |
| 7,765,770 | B2 * | 8/2010 | Fournier | 52/843 |
| 7,851,702 | B2 * | 12/2010 | Fournier et al. | 174/45 R |
| 2013/0299653 | A1 * | 11/2013 | Emmons et al. | 248/205.3 |
| 2014/0360754 | A1 * | 12/2014 | Walton et al. | 174/86 |

\* cited by examiner

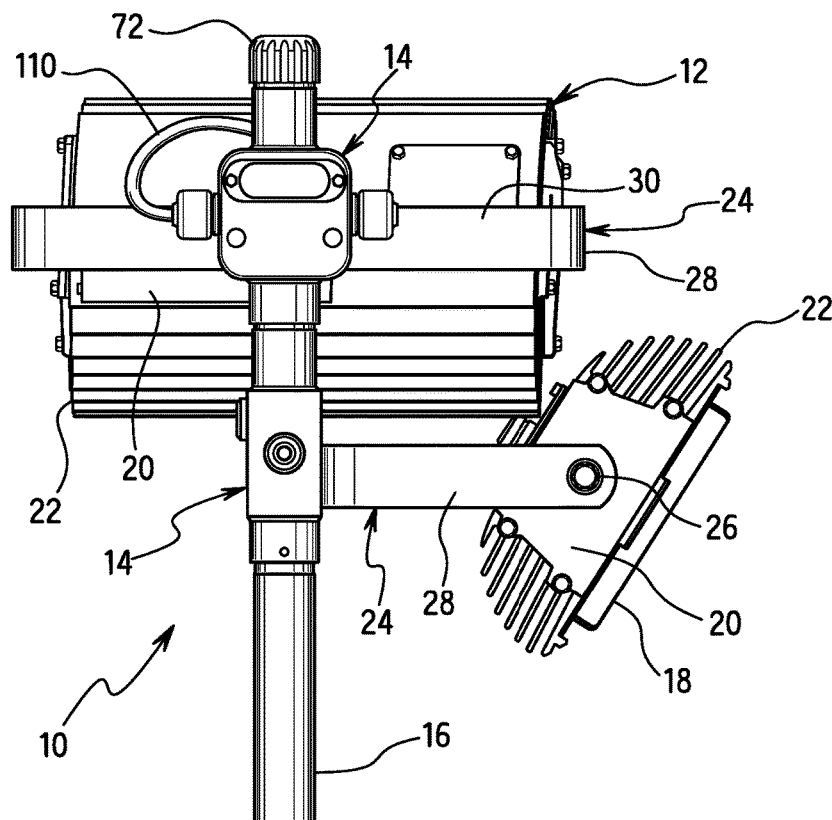
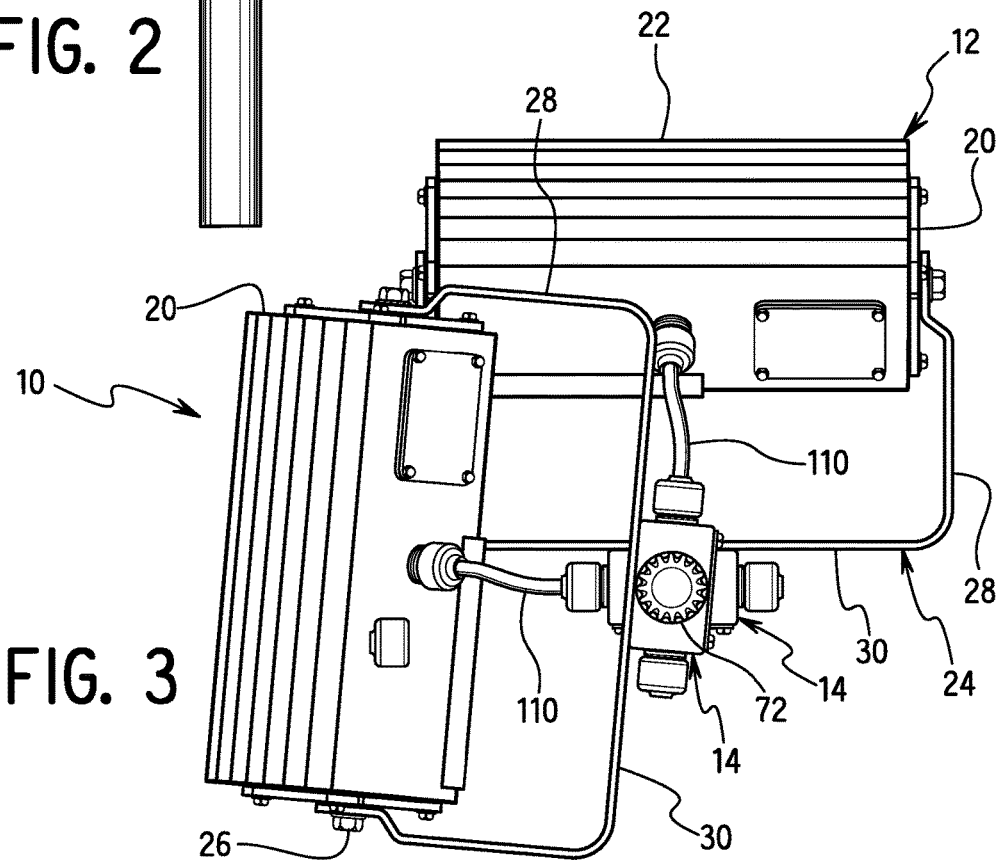

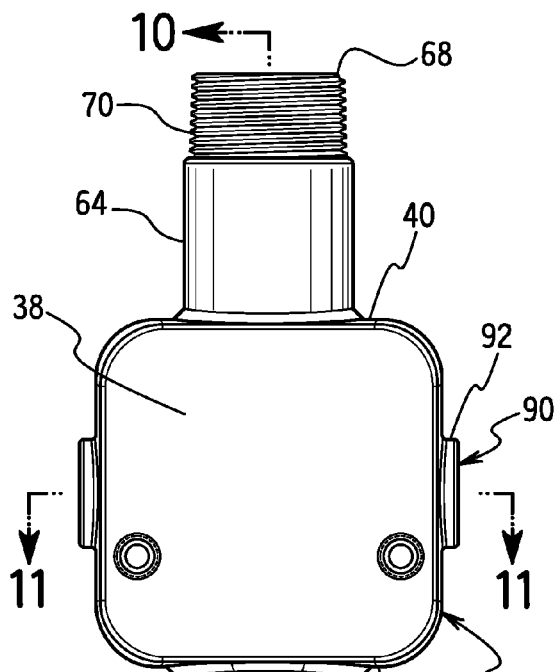
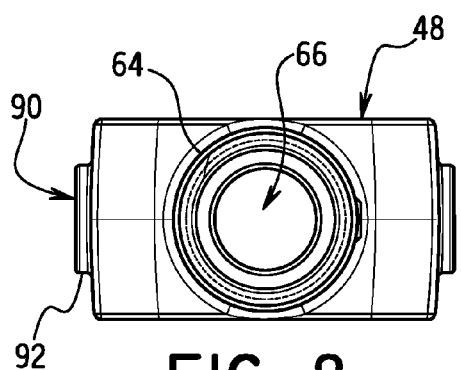
FIG. 8
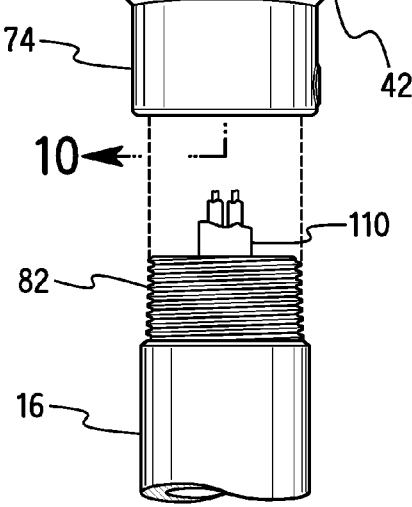
FIG. 7
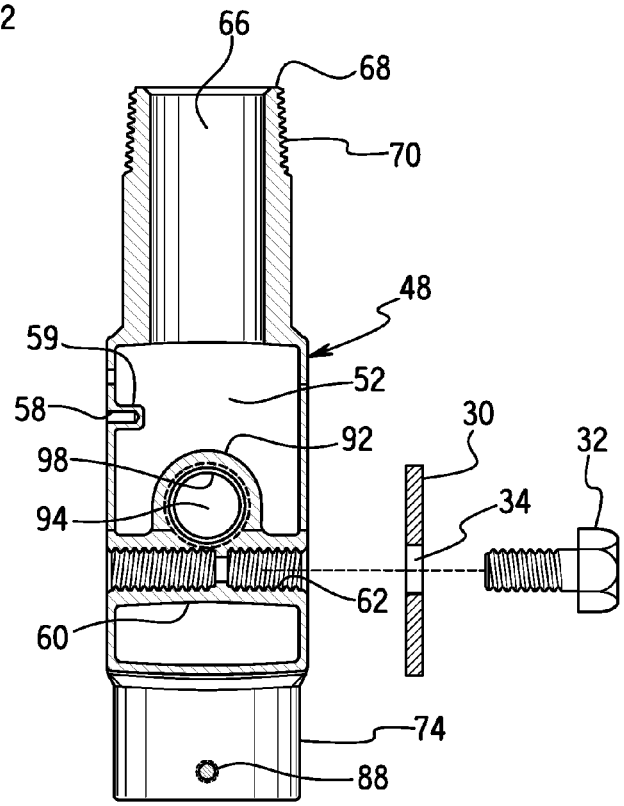
FIG. 9

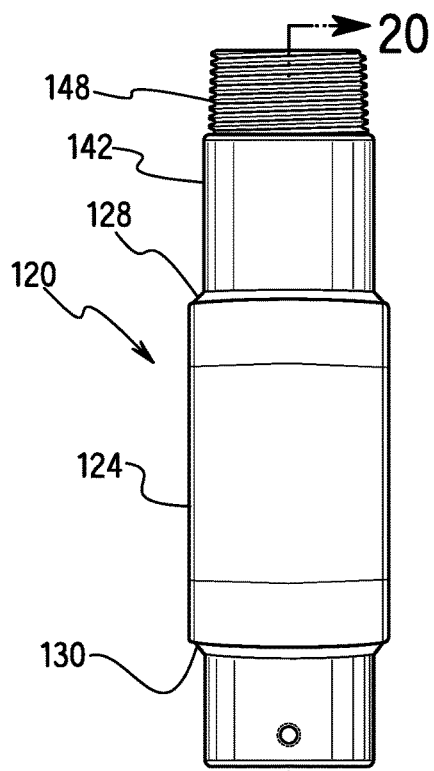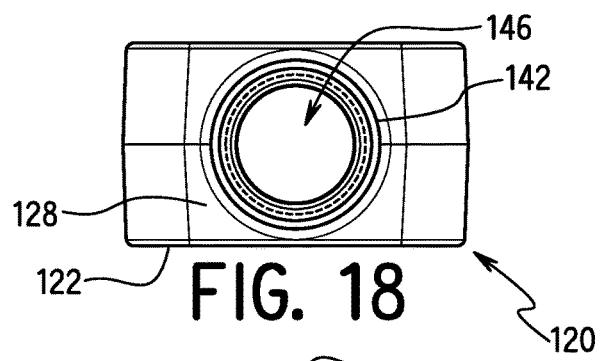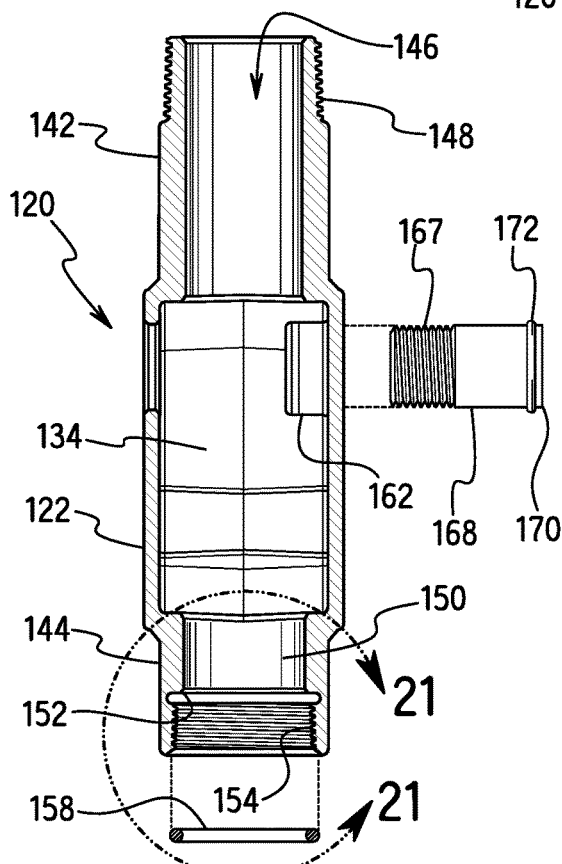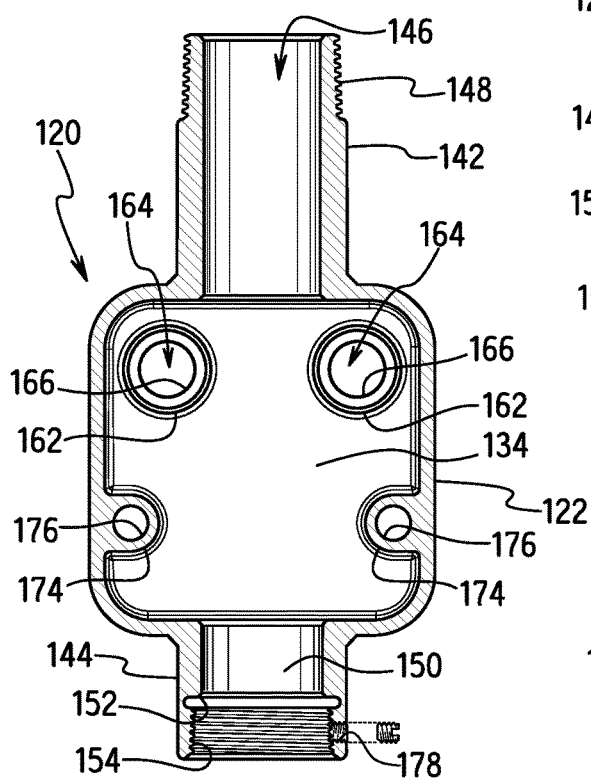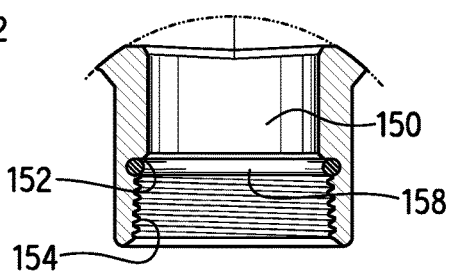

ELECTRICAL DEVICE MOUNTING ASSEMBLY

FIELD OF THE INVENTION

The present invention is directed to a mounting assembly for mounting and supporting an electrical device. The invention is particularly directed to a molded one-piece mounting member for forming a waterproof or weatherproof seal with a support member while allowing rotational movement between the mounting member and the support member.

BACKGROUND OF THE INVENTION

Mounting brackets and supports for various electrical devices are commonly used for attaching the electrical device, such as a light, to a pole or other support. The mounting brackets often have one end that can be attached to a base and another end attached to the electrical device.

U.S. Pat. No. 1,772,934 to Fish discloses a lighting attachment including a bracket that is slidable on a rod. The mounting bracket has an opening for receiving the electrical wiring and feeding the electrical wiring to the lighting attachment.

U.S. Pat. No. 3,903,409 to Richilano discloses an outdoor light mounting device including a bracket for attaching to a pole. The bracket slides onto the end of the pole and is attached by screws. The bracket has a hollow cavity for feeding wires through the conduit to the light.

U.S. Pat. No. 3,928,758 to Osteen et al. now discloses a flood light having a mounting bracket as shown in FIG. 1A that attaches to a vertical pole. The mounting bracket has a hollow cavity for feeding the wiring from the conduit to the flood light. The end of the bracket has a female end for receiving the end of the conduit which is secured by screws.

U.S. Pat. No. 4,975,071 to Bedocs et al. discloses a track lighting device for a lamp fitting. The end of the adapter has a hollow body member that slides in a track.

U.S. Pat. No. 5,306,871 to Lai discloses an electrical cord assembly for a lighting fixture which is mounted to a vertical pole. The mounting assembly has a female threaded end at a bottom edge shown in FIG. 3 for attaching to the pole and two female threaded openings on the top edge.

U.S. Pat. No. 5,307,255 to Chen discloses a portable lamp mounted to a base by a bracket as shown in FIG. 4. The bottom end of the bracket has a threaded opening for receiving a mounting screw and a female threaded end at the top edge for connecting to the conduit 21. The electrical wires are fitted through an opening in the sidewall of the bracket.

U.S. Pat. No. 5,414,607 to Harris et al. discloses an outdoor landscape lighting fixture having an integral wiring compartment with a base connected to a conduit. The wiring compartment supports the lamp which extends from the top end of the compartment.

U.S. Pat. No. 6,536,927 to Lawnicki discloses a light fixture extension adapter. The adapter has a male threaded end for connecting to a fixture shown in FIG. 5 and a female threaded end for connecting to the lamp.

U.S. Pat. No. 7,402,074 to LeBlanc et al. discloses a flood light fixture having a bracket with an integral strap tensioning device. The bracket is coupled to a support by the strap.

U.S. Patent Publication No. 2006/0274537 to Randazzo discloses a lamp assembly with a rotary adjustable photocell adapter. The adapter includes a housing which is coupled to the top end of the conduit. The top end of the housing has an open end for attaching to the light assembly.

While these prior devices have generally been suitable for their intended purpose, there is a continuing need in the industry for an improved mounting assembly.

SUMMARY OF THE INVENTION

The present invention is directed to a mounting member for an electrical device to enable adjustment of the position of the electrical device relative to the support. The invention is particularly directed to a mounting member providing a waterproof connection between the mounting member and the support and between two connected mounting members.

The mounting member of the invention is preferably formed as a one piece, unitary molded device. The mounting member is constructed so that several of the mounting members can be coupled together without the use of separate connectors while providing adjustment or movement between the respective mounting members and between the mounting members and the support. Preferably the mounting member is made of metal that is cast as a one-piece member and machined to the finished form by the cutting threads and other necessary features of the mounting member.

The mounting member in one embodiment of the invention has a first coupling end and an opposite second coupling end with a wire passage for directing wires to one or more electrical devices. In one embodiment one end is configured for mating with a support for supporting the electrical device. The opposite end is configured for mating with an end of a second mounting member so that a plurality of the mounting members can be coupled end-to-end in a stacked relation for supporting a plurality of electrical devices by a single support structure. A cap is also provided to close the open end of the coupling member.

In one embodiment of the invention, the mounting member has a first coupling with an axial passage having internal threads and a second coupling with an axial passage and external threads that complement the internal threads of the first coupling for coupling a plurality of the mounting members together in series or for attaching the mounting member to a threaded end of a support. The mounting member can be attached to a support by either the first coupling with a second coupling. The support can be a floor mounted support or a ceiling mounted support.

The mounting member of the invention is a one-piece molded unit having an internal cavity, a first side, and a second side. The first side is provided with an access opening with a dimension sufficient to access the wires contained within the cavity for making suitable electrical connections between a power source and the electrical device. A cover is attached to the first side of the mounting member to close the access opening and form a weatherproof seal to prevent water and dust from entering the cavity of the mounting member.

The mounting member in one embodiment of the invention has a coupling with an axial passage having internal threads extending from the open end of the coupling to a base portion of the coupling. The inner surface of the coupling has an annular recess at the base portion spaced from the open end. An annular seal member such as an O-ring is received in the annular recess. The internal threads of the coupling mate with the external threads of a support or with the external threads of a second mounting member. The mounting member is threaded onto the external threads of the support so that the seal member contacts the end of the support for forming a weatherproof seal. The seal member has a dimension and sufficient resilience and compressibility to allow some rotational adjustment and movement of the threaded connector of the mounting member on the threaded end of the support while maintaining the weatherproof seal. In one embodiment the seal member allows the mounting member to rotate about ¾ of a turn while maintaining contact with the axial face of the support to form the weatherproof seal and connection.

The various features of the invention are basically attained by providing an electrical assembly comprising a support, a mounting member, a first coupling, and an electrical fixture coupled to the mounting member. The support has an open end with a passage for carrying electrical wires where the open end has external threads. The mounting member has a body with a hollow cavity, a first side, a second side, a first longitudinal end, and a second longitudinal end. The first coupling extends from the first longitudinal end of the body and has an axial passage communicating with the cavity in the body. The axial passage has internal threads extending between the outer end of the first coupling to a base portion of the first coupling. The base portion has an annular recess and a seal member received in the annular recess. The internal threads of the first coupling can be coupled to the external threads of the support or to the external threads of another mounting member. The seal member mates with an open end of the support and allows rotational adjustment of the mounting member with respect to the support and forms a weatherproof seal between the mounting member and the support. The axial passage of the first coupling directs the electrical wires to the cavity of the mounting member. The electrical fixture includes wires extending through an opening in the second side of the mounting member and is electrically connected to the electrical wires in the cavity.

The various features of the invention are also attained by providing an electrical assembly comprising a support and a mounting member. The support has a tubular shaped end with an axial passage for carrying electrical wires. The mounting member has a body with a hollow cavity, a first longitudinal end, second longitudinal end, a first side, and a second side. A first coupling has an axial passage communicating with the cavity in the body and an inner surface with internal threads. An annular recess is provided in the axial passage at a base portion of the coupling and the internal threads. A seal member is received in the annular recess. A second coupling extends from the second end of the body and has an axial passage communicating with the cavity. The second coupling has an outer surface with external threads complementing the internal threads of the first coupling for coupling with a first coupling of an adjacent mounting member. The first side of the body has an access opening communicating with the cavity. A removable cover is coupled to the first side for closing the access opening. The second side of the body has at least one collar extending into the cavity and having an axial bore communicating with the cavity and defining a wire outlet where the axial bore has internal threads for receiving a cylindrical guide sleeve.

The various features of the invention are further attained by providing an electrical assembly comprising a support having a substantially tubular shaped end with an axial passage and an end with external threads. A first and second one-piece unitary mounting member is provided having a body with a first longitudinal end, a second longitudinal end, a first front side and a second rear side. A first cylindrical coupling extends from the first end and has internal threads for coupling with the external threads of the support. A second cylindrical coupling extends from the second end and has external threads complementing the internal threads of the first coupling. The first side has an access opening for accessing wires within the cavity. The second side has a wire outlet opening. An electrical fixture is coupled to the mounting electrically connected to the wires from the wire outlet opening.

The various objects, advantages and salient features of the invention will become apparent from the annexed drawings and detailed description of the invention which form part of the original disclosure.

BRIEF DESCRIPTION OF THE DRAWINGS

The following is a brief description of the drawings, in which:

FIG. 2 is a side view of the electrical assembly of FIG. 1;

FIG. 3 is a top view of the electrical assembly of FIG. 1;

FIG. 7 is a rear view of the mounting member;

FIG. 8 is an end view of the mounting member;

FIG. 9 is a cross-sectional view taken along line 9-9 of FIG. 5;

FIG. 17 is a side view of the mounting member of FIG. 14;

FIG. 18 is an end view of the mounting member of FIG. 14;

FIG. 19 is a cross-sectional view of the mounting member taken along line 19-19 of FIG. 15;

FIG. 20 is a cross-sectional view of the mounting member taken along line 20-20 of FIG. 17;

FIG. 21 is an enlarged view of the coupling end of the mounting member of FIG. 19;

DETAILED DESCRIPTION OF THE INVENTION

The present invention is directed to an electrical assembly including a mounting member for supporting an electrical device for an electrical fixture such as a lighting device, which can be adjusted relative to a support while providing the weatherproof connection to protect the wires and electrical connectors for the electrical device. The invention is particularly directed to a mounting member that can be coupled in series with other identical mounting members for mounting a plurality of electrical devices on a single support and where the mounting members can be rotated with respect to each other so that the position or orientation each of the electrical devices can be adjusted with respect to each other and to the support.

Figure 1:
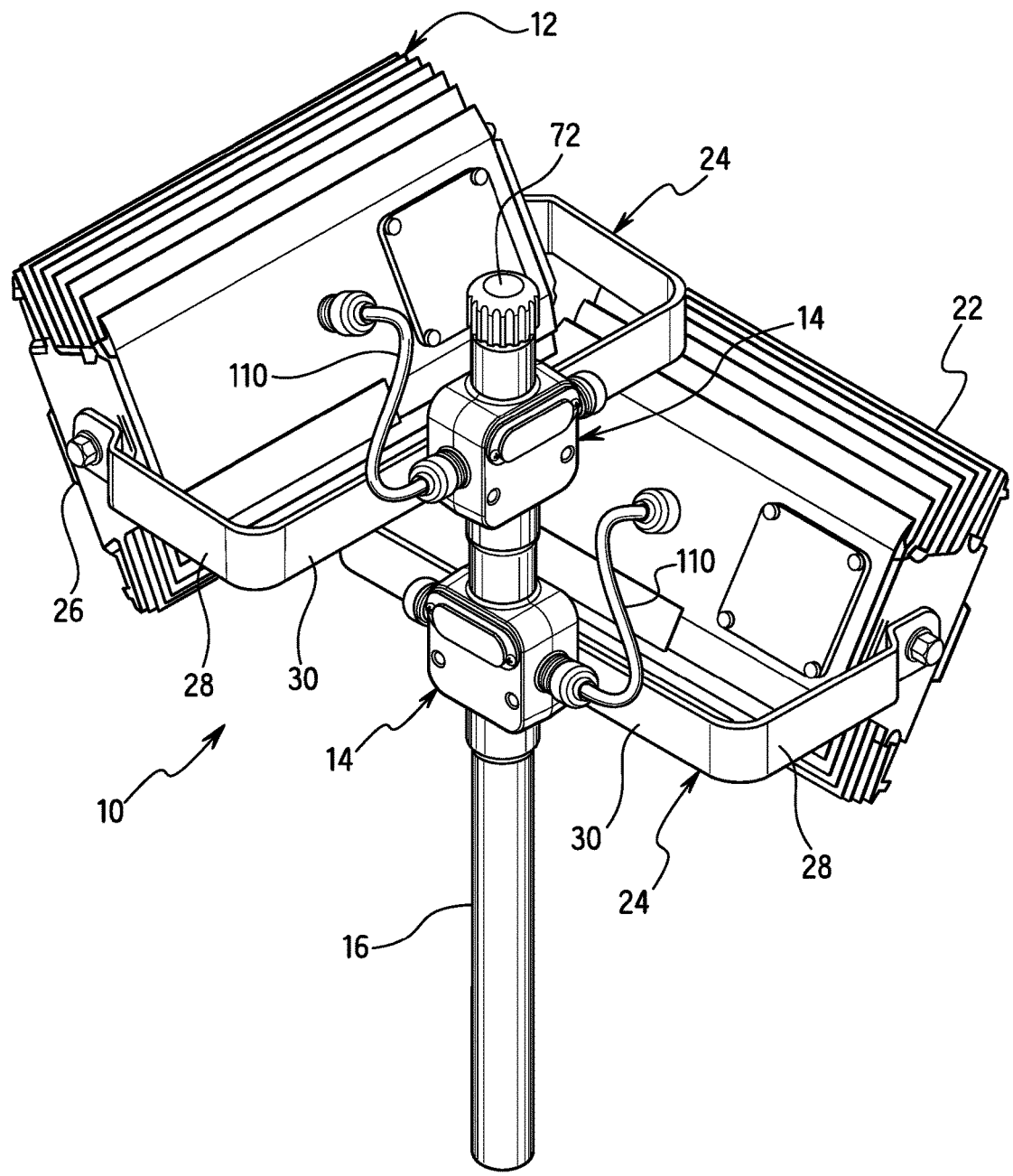
FIG. 1 is a perspective view of the electrical assembly mounted to a support in one embodiment of the invention.
Figure 4:
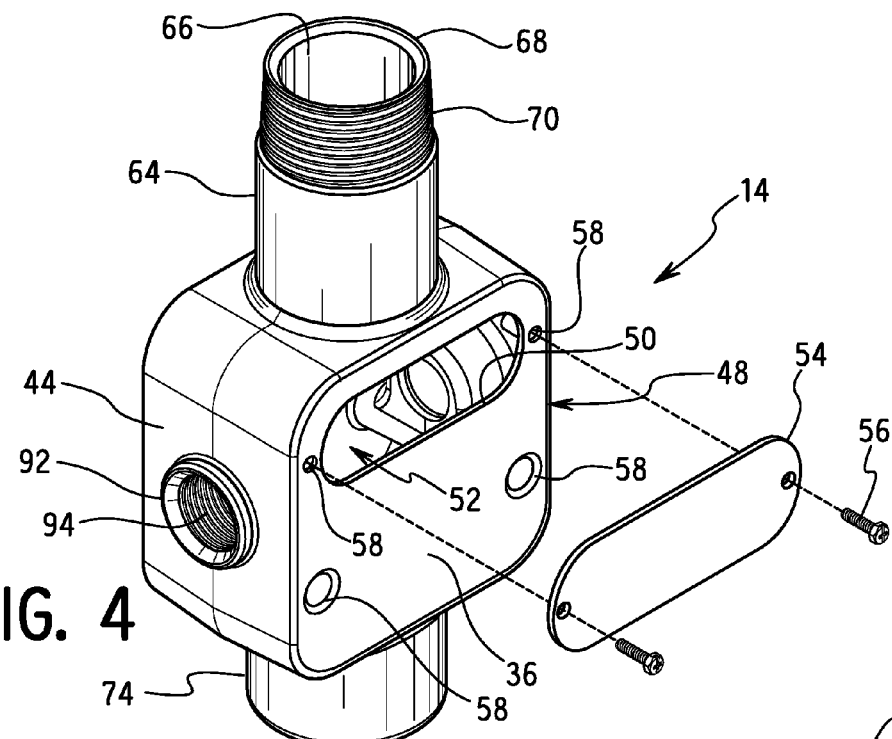
FIG. 4 is an exploded view of the mounting member in one embodiment of the invention.

Referring to the drawings, the electrical assembly 10 includes an electrical device 12 shown as a flood light connected to a mounting member 14. The mounting member is attached to a support such as a support pole 16 as shown in FIGS. 1-3 or to a ceiling mounted shown in FIGS. 22 and 23. The support pole 16 of FIGS. 1-3 is attached to a suitable base (not shown) for supporting the pole 16 in the upright position and supporting the floodlights 12 or other electrical device. The support pole 16 preferably has a threaded end 82 and a hollow axial passage for supplying wires from a power source to the mounting members and to the electrical device.

The mounting member of the invention is suitable for mounting various electrical devices. In the embodiment shown the electrical device is a flood light 12 although other electrical devices can be used. The floodlights 12 in the embodiment shown have a front face 18 for projecting light in a selected direction and a housing 20 with cooling fins 22. The floodlights 12 have a suitable light source such as a series of LEDs or other suitable lamps. A yoke 24 or other mounting bracket is attached to the sides of the housing 20 by a bolt 26 to allow angular adjustment of the flood light with respect to the yoke 24. The yoke 24 has legs 28 attached to the opposite sides of the housing 20 and a body 30 extending between the legs 28 for attaching directly to the mounting member. Mounting bolts 32 or mounting screws extend through apertures 34 in the body 30 and are threaded into screw holes 58 in the mounting member 14 for mounting the flood light to the respective mounting member.

Figures 22, 23:
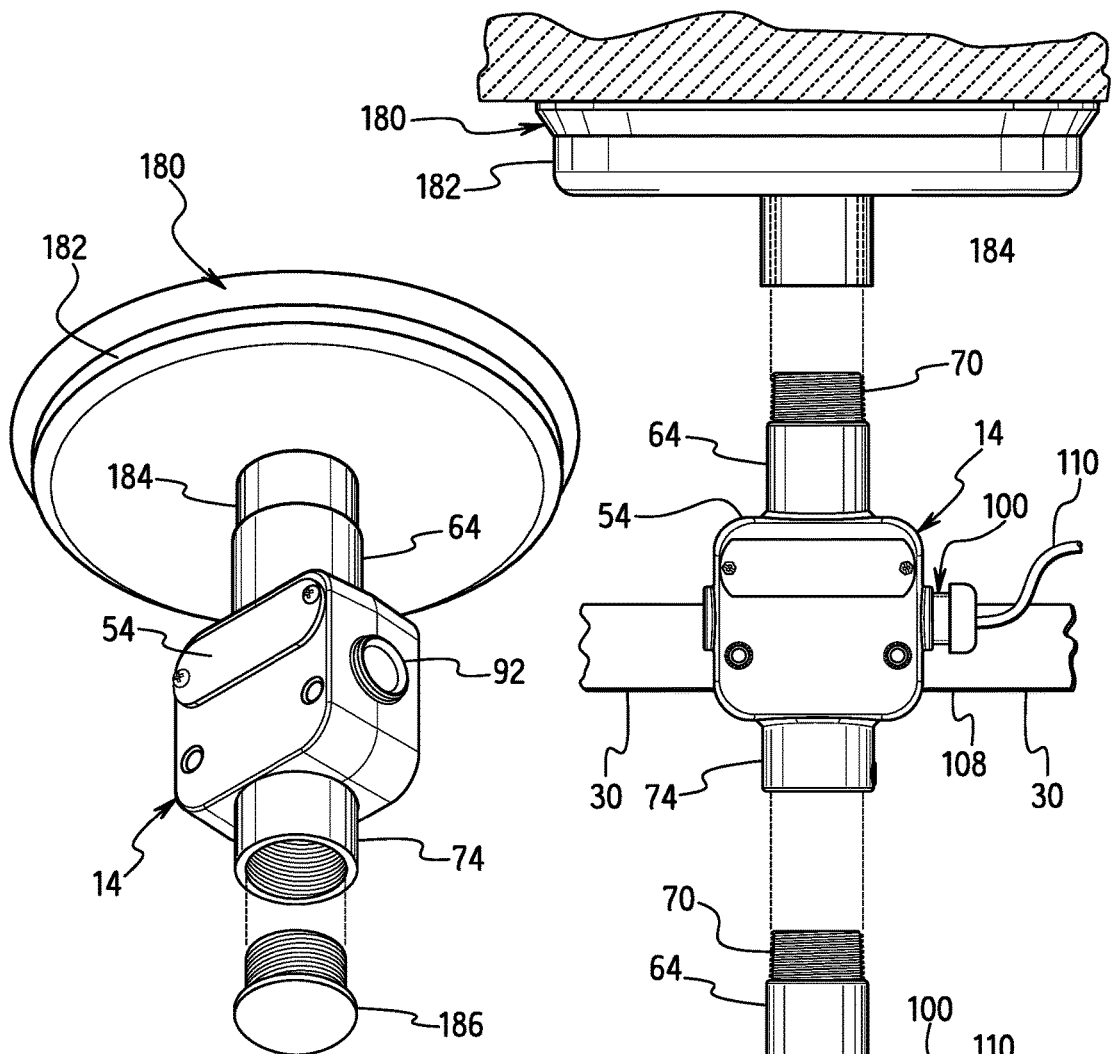
FIG. 22 is a perspective view of the mounting member in another embodiment of the invention.
FIG. 23 is an exploded side view of the mounting of FIG. 22.

As shown in FIGS. 1-3, the mounting members 14 can be coupled together in series for mounting several floodlights or other electrical devices to a single support pole or to a ceiling mount as shown in FIGS. 22 and 23. As discussed hereinafter in greater detail, each of the mounting members 14 can be rotated independently of each other and with respect to the support pole 16 or ceiling mount to position the floodlights 12 in various angular directions as needed.

Referring to FIGS. 4-13 a first embodiment of the invention is shown. The mounting member 14 is preferably a one piece, integrally formed member. In preferred embodiments, the mounting member 14 is a cast metal unit having a body 48 with a front wall forming a front face 36, a rear wall forming a rear face 38, a first longitudinal end 40 and a second longitudinal end 42. A first side 44 and a second side 46 extend between the front face 36 and rear face 38.

The front face 36 has a substantially flat configuration with an access opening 50 to the hollow cavity 52 within the body 48 of the mounting member 14. The cavity 52 preferably has a dimension to receive wires passing through the body 48 from the support 16 and allow electrical connections between the wires from the support and the wires from the electrical device 12. The access opening 50 has a dimension to allow the user to make the necessary connections between the wires. A cover 54 is attached to the body 48 by screws 56 received in screw holes 58 in the body 48 to provide a weatherproof seal and protect the wires within the cavity 52 from water and dirt. As shown in FIG. 9, a boss 59 projects into the cavity 52 to form the threaded screw holes 58.

In the embodiment shown, the front face 36 and the rear face 38 have internally threaded holes 34 for receiving the mounting bolts 32 for mounting the yoke 24 of the electrical device 12 to the mounting member 14. Referring to FIG. 9, the cavity 52 is provided with a boss 60 that extends between the front face 36 and the rear face 38. In the embodiment shown, the internal threads 62 extend though the bore in the boss. Alternatively, the bore can extend part way through either the front face or the rear face so that the bore does not extend completely through the body 48. In this manner the mounting bolts 32 can be attached to either or both the front face or the rear face for selectively mounting the electrical device to the mounting member 14. Alternatively, the apertures 34 can be formed in either the front face or the rear face only.

A first coupling 64 extends from the first longitudinal end of the body 48. The first coupling in the embodiment shown has a cylindrical shape with an axial passage 66 and an open threaded end 68 with external threads 70. In a preferred embodiment, the threaded end 68 has a slight taper for mating with complementing threads. A cap 72 as shown in FIGS. 1-3 is provided to close the open end of the coupling 64 of the mounting member 14. The external threads 70 are configured for coupling end-to-end with an adjacent mounting member as discussed below or for coupling to a suitable support.

A second coupling member 74 extends from the second longitudinal end of the body 48. The second coupling member has an axial passage 76 communicating with the cavity 52 for supplying the electrical wires from the support pole to the cavity and flood light 12. In a preferred embodiment, the axial passage 66 of the first coupling 74 is aligned with the axial passage 76 of the second coupling 74. In the embodiment shown, the coupling members extend from the body from opposite longitudinal ends. Alternatively, the coupling members can extend from different sides perpendicular to each other depending on the desired mounting arrangement of the electrical devices 12.

Figure 10:
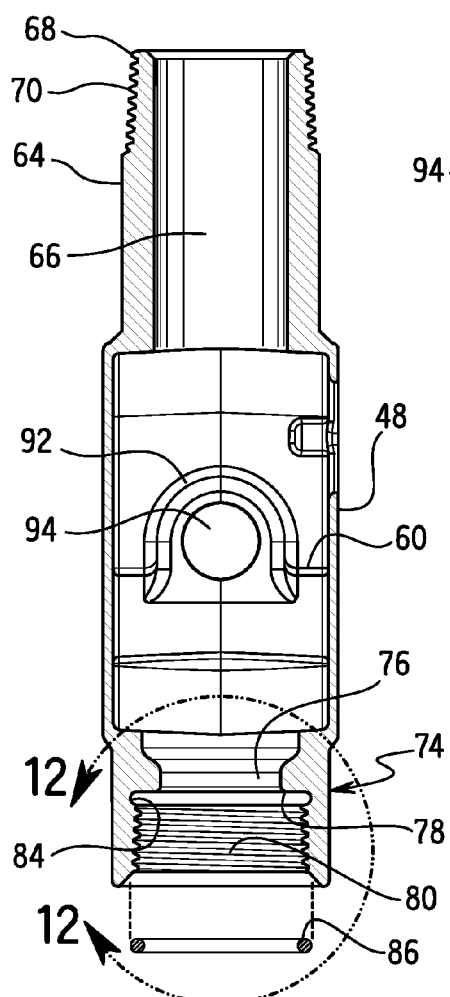
FIG. 10 is a cross-sectional view of the mounting member taken along line 10-10 of FIG. 7.
Figure 12:
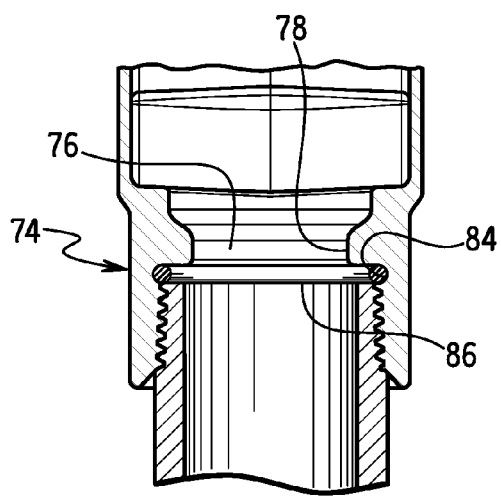
FIG. 12 is an enlarged cross-sectional view of the coupling end of FIG. 10.

Referring to FIGS. 10 and 12, the second coupling 74 has an inwardly extending lip 78 at a base portion of the coupling 74 and a cylindrical inner surface having internal threads 80. The internal threads 80 are configured for mating with the external threads 82 of the support pole 16 as shown in FIG. 12 or to the first coupling of a second mounting member. The inner surface of the second coupling 74 has an annular recess 84 at the base of the lip 78 so that the annular recess 84 is positioned between the internal threads 80 and the lip 78. An annular seal member 86 is received in the annular recess 84 as shown in FIG. 12. In one preferred embodiment, the seal member 86 is an O-ring having a dimension to seat in the annular recess 84 and form a seal between the end of the support pole 16 and the lip 78 of the mounting member.

As shown in FIG. 12 the end of the support pole 16 is threaded into the threaded axial passage of the second coupling member 74 to mount the coupling 74 and the respective electrical device 12 to the pole 16. The threaded end is threaded into the second coupling member so that the axial end of the pole 16 engages the seal member 86 to form a weatherproof seal to prevent water and dirt from entering. In preferred embodiments of the invention the seal member has a dimension and is made of a sufficiently resilient material to compress and form the weatherproof seal and to allow rotational movement and adjustment of the mounting member on the pole 16. In one embodiment of the invention, the seal member 86 has a dimension to allow rotation of about ¾ of a turn of the mounting member 14 on the pole 16 and still maintain a weatherproof seal between the mounting member 14 and the pole 16. As shown in FIGS. 1-3, the position of the mounting members 14 can be adjusted by rotation of the mounting members 14 on the pole 16 while maintaining a weatherproof seal between the mounting member 14 and the pole 16.

The mounting members 14 are configured so that a plurality of mounting members can be connected together in series as shown in FIGS. 1-3. The external threads of the first coupling 64 complement the internal threads of the second coupling 74 so that the coupling members 14 can be screwed together in series in an end-to-end manner as shown. The seal member 86 in the second coupling 74 forms a weatherproof connection between the mounting members to allow rotational adjustment between the mounting members and maintain the weatherproof connection. The seal member preferably enables rotation of about ¾ of a turn between the two mounting members and still maintains the weatherproof connection between the mounting members. A set screw 88 extends through a radial hole in the second coupling 74 to lock the position of the second coupling 74 relative to the pole 16. In one preferred embodiment the mounting members 14 are oriented with the first coupling extending upward. Alternatively, the mounting member 14 can be oriented with the second coupling extending upward.

Figure 11:
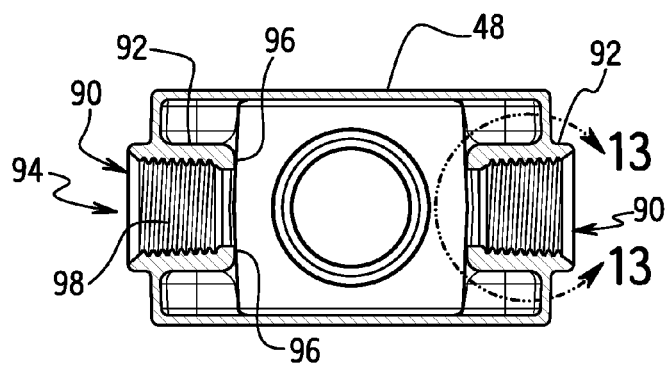
FIG. 11 is a cross-sectional view taken along line 11-11 of FIG. 7.
Figure 13:
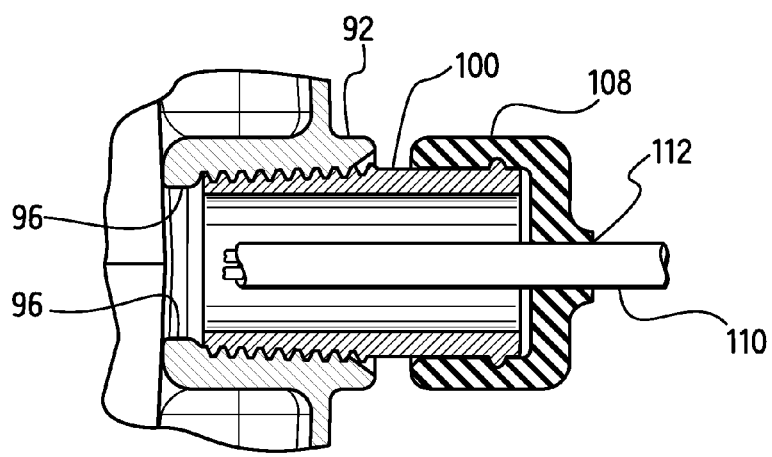
FIG. 13 is an enlarged cross-sectional view of the coupling of FIG. 11.
Figure 14:
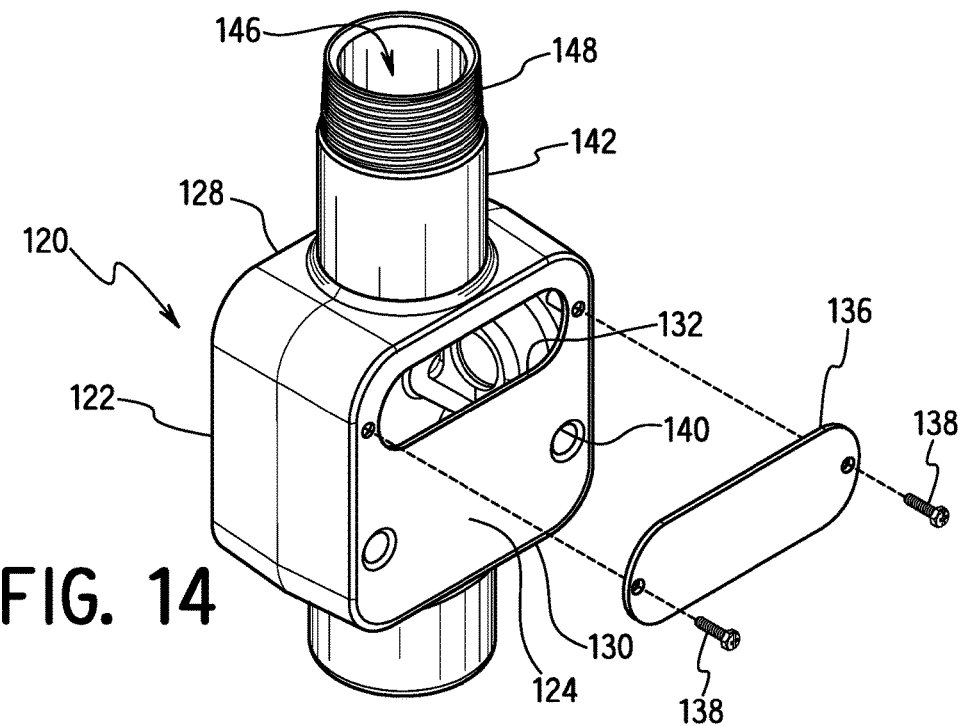
FIG. 14 is an exploded view of the mounting member in a second embodiment.
Figure 15:
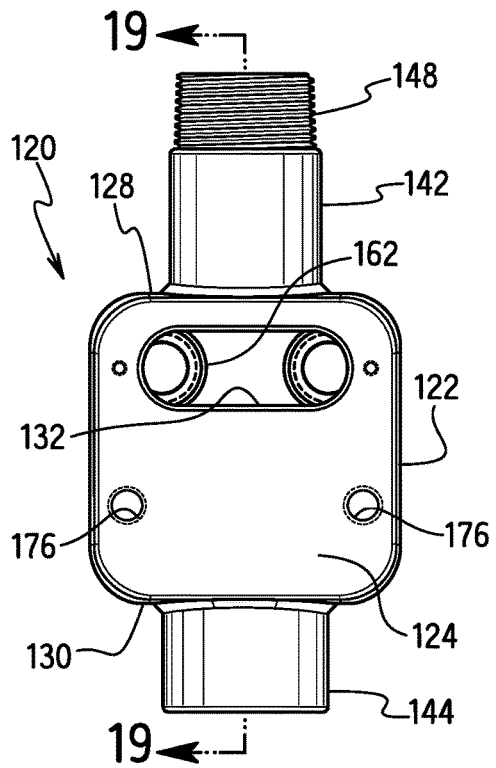
FIG. 15 is a front view of the mounting member of FIG. 14.
Figure 16:
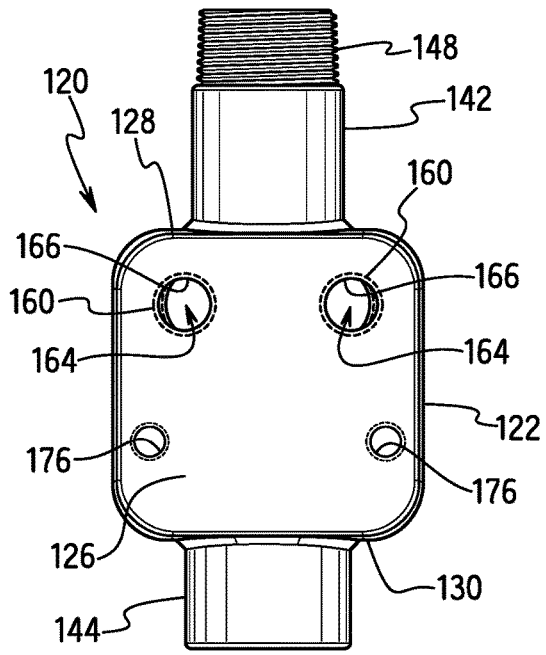
FIG. 16 is a rear view of the mounting member of FIG. 14.

The body 48 in the embodiment shown has at least one and preferably two wire outlets 90 for directing the electrical wires from the cavity of the mounting members 14 to the electrical device 12. In the embodiment shown, the wire outlets 90 are formed in the sides 44 and 46. Referring to FIGS. 11 and 13, the wire outlets 90 are formed by a collar 92 that projects outward from the outer face of the sides 44 and 46 and that extends into the cavity 52. The collar 92 has an axial passage 94 with an inner lip 96 at the base of the collar. The inner surface of the axial passage 94 is provided with internal threads 98 and is open to the cavity 52 to allow the electrical wires 110 to pass from the cavity to the electrical device.

Figure 5:
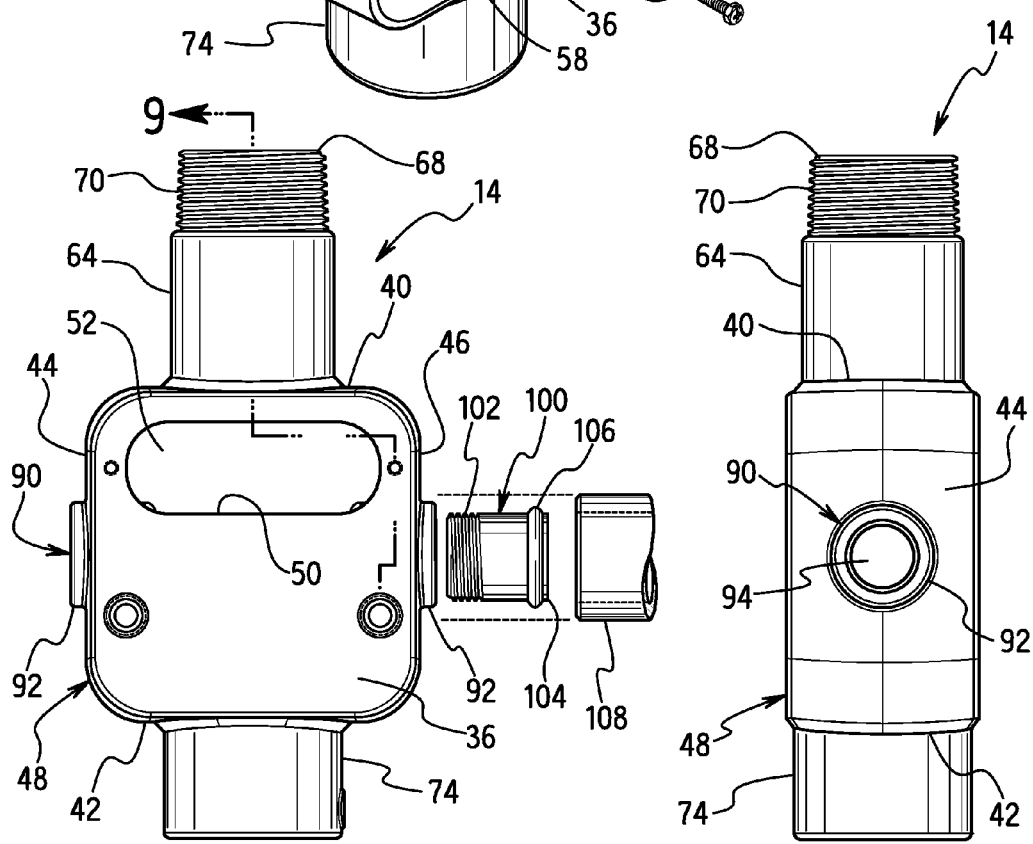
FIG. 5 is a front view of the mounting member of FIG. 4.
Figure 6:
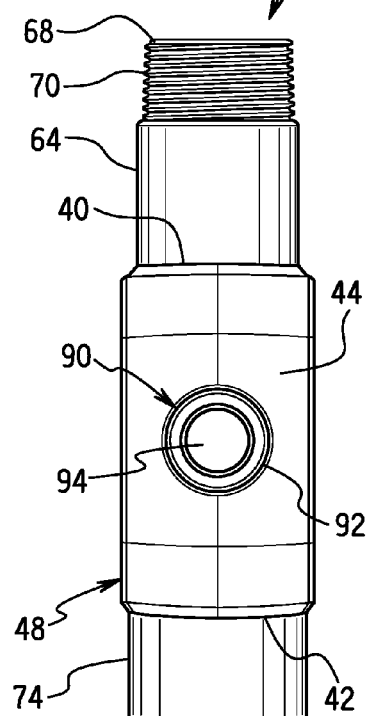
FIG. 6 is a side view of the mounting member.

Referring to FIG. 5, a sleeve 100 having an axial passage and an externally threaded end 102 forms a coupling for the mounting member 14 to direct the electrical wires to the electrical device 12. The sleeve 100 is threaded into the collar 92 as shown in FIG. 5. The sleeve 100 has an outer end 104 with an annular rib 106 or recess for mating with a bushing 108 or grommet that forms a waterproof seal between the wires 110 passing through the sleeve to the electrical device. The bushing preferable has a hole 112 with a dimension complementing the outer dimension of the wires 110 to form a seal with the wire and resist water and dirt from entering the mounting member. The bushing 108 preferably slides over the outer surface of the sleeve 100 to form a seal. The bushing 108 is preferably made of an elastomeric or rubber-like material to grip the outer surface of the sleeve 100 and form the waterproof seal.

In the embodiment shown, a single set of wires 110 extends from one of the wire outlet 90. In other embodiments, wires can extend through each of the wire outlets to one or more electrical devices. In the event one of the wire outlets is not being used, a suitable plug or cap can be coupled to the wire outlet to close the opening.

Referring to FIGS. 14-21 a second embodiment of a mounting member 120 is shown which is similar to the embodiment of FIGS. 1-13. The mounting member 120 has a body 122 with a front face 124, a rear face 126, a first longitudinal end 128 and a second longitudinal end 130. The front face 124 of the body 122 has an access opening 132 for accessing the internal cavity 134 and a cover 136 to close the access opening 132 by screws 138 that screw into screw holes 140 in the front face 124.

A first coupling 142 extends from the first longitudinal end 128 and a second coupling 144 extends from the second longitudinal end 130. As in the previous embodiment, the first coupling 142 has an axial passage 146 and an end with external threads 148 and the second coupling 144 with internal threads 154 that complement the external threads 148. The second coupling 144 has an axial passage 150 with an inwardly extending lip 152, internal threads 154 and an annular recess 156 for receiving an annular seal 158 such as an O-ring as shown in FIG. 19 and FIG. 21. As in the previous embodiment, the annular seal member 158 forms a weatherproof connection between the pole 16 and the mounting member 120 to allow rotational movement between the pole and the mounting member while maintaining a weatherproof connection.

In this embodiment, the rear face 126 includes two spaced-apart wire outlets 160 defined by a collar 162 extending inwardly into the cavity of the body 122 as shown in FIG. 19. The collar 162 has an axial passage 164 with internal threads 166 for mating with the external threads 167 of a sleeve 168. The sleeve 168 is threaded into the collar 162 to form a guide for the wires to the electrical device. The end 170 of the sleeve has a rib 172 for mating with a bushing 108 or grommet as in the previous embodiment.

The body 122 includes two internal bosses 174 extending between the front face 124 and the rear face 126 as shown in FIG. 20 forming two spaced-apart apertures 176 for receiving the mounting screws to attach the electrical device to the mounting member. As in the previous embodiment, the screw apertures 176 extend through the body and have internal threads for the mounting screws or bolts of the electrical device.

The mounting member 120 is attached to a support pole in a manner similar to the previous embodiment by screwing the coupling 144 to the threaded end of the support pole. The seal member 158 contacts the axial end of the pole to form a seal while allowing some rotational adjustment of the mounting member 120 with respect to the pole. A set screw can be screwed into a threaded aperture 178 in the coupling 144 to lock the mounting member in place. A plurality of the mounting members can be coupled in series as in the embodiment of FIGS. 1-3 for mounting various electrical devices to a single support pole and allow adjustment of each of the mounting members with respect to each other and to the support pole while maintaining a weatherproof connection between the different components.

In another embodiment shown in FIGS. 22 and 23 the mounting member 14 can be attached to a ceiling support 180 so that the mounting members are suspended and extend downward. In the embodiment shown, the ceiling support 180 has a housing 182 that is fixed to a ceiling or other support surface. The housing 182 has a downwardly extending sleeve 184 with internal threads that complement the external threads of the first coupling of the mounting member 14. The mounting member 14 is screwed into the sleeve 184 and positioned orient the flood light in a selected direction. As in the previous embodiments, a plurality of the support members 14 can be connected together in series so that several floodlights or other electrical wiring devices can be suspended and electrically connected to the power source. As shown in FIGS. 22 and 23 a second coupling of the mounting member can be closed by a plug 26. The plug can be an elastomeric material and coupled by a friction fit or can be provided with suitable threads for screwing into the internal threads of the second coupling.

While various embodiments have been chosen to illustrate the invention, it will be understood by those skilled in the art that various changes and modifications can be made without departing from the spirit and scope of the invention as defined in the appended claims.

What is claimed is:

1. A mounting assembly for mounting at least one electrical device comprising:
    a support device;
    at least one mounting member having a body, a first side, a second side, a first longitudinal end with a first attachment device attached to said support device, and a second longitudinal end with a second attachment device attached to said support device;
    a sealing member preventing foreign objects from entering the body of said at least one mounting member disposed between one or more of the first attachment device and said support device and the second attachment device and said support device, wherein said at least one mounting member rotates relative to said support device;
    wherein said support device is cylindrical and includes a passage carrying electrical wires to said at least one mounting member, and
    wherein at least one of the first and second attachment devices are attached to said support device by a threaded engagement.

2. The mounting assembly recited in claim 1 wherein said first and second attachment devices are cylindrical and have an inside diameter substantially equal to an inside diameter of said support device.

3. The mounting assembly recited in claim 1 wherein said at least one mounting member includes an inner chamber accommodating an electrical connection between the electrical wires carried by said support device and said electrical device.

4. The mounting assembly recited in claim 1 wherein said at least one mounting member further has a front face and a back face and at least one boss member in each of said front and back faces to which said electrical device is attached.

5. The mounting assembly recited in claim 4 wherein said at least one boss member is threaded for receiving a threaded attachment device for attaching said electrical device to said at least one mounting member.

6. The mounting assembly recited in claim 4 wherein said at least one of said first and second side of said mounting member includes a sealable aperture accommodating electrical wires for establishing the electrical connection between said electrical device and said electrical wires carried by said support device.

7. The mounting assembly recited in claim 1 wherein said electrical device is adjustable in an axial direction to said support device by rotating said at least one mounting member relative to said support device.

8. The mounting assembly recited in claim 1 wherein said electrical device is a lighting device.

9. The mounting assembly recited in claim 8 wherein said lighting device includes one or more light emitting diodes (LEDs).

10. The mounting assembly recited in claim 7 further comprising a fixing device maintaining said at least on mounting member in a fixed position relative to said support device.

11. A mounting member for attaching an electrical device to a support member, comprising:
    a body having an internal cavity, a first side, a second side, a top surface, a bottom surface a front face and a back face;
    a first coupling device disposed at said top surface;
    a second coupling device disposed at said bottom surface;
    one or more sealable apertures disposed in one or more of said first and second sides, respectively;
    at least one of a front attachment device disposed on said front face and a back attachment device disposed on said back face configured to enable attachment of said electrical device;
    a sealing member providing a seal to prevent foreign objects from entering said body of said mounting member; and
    wherein one of said first and second coupling devices includes outer threads engaging said support member and one of said first and second coupling devices includes inner threads engaging said support member.

12. The mounting assembly recited in claim 11, wherein said mounting member is adjustable about an axis of said support member while maintaining said seal.

13. The mounting assembly recited in claim 11, wherein said support member is cylindrical and extends from one or more of a ceiling and a floor.

14. The mounting assembly recited in claim 13, wherein said sealing member includes an annular ring disposed in one or more of said first and second coupling devices or between said support member and one or more of said first and second coupling devices.

15. The mounting assembly recited in claim 11, wherein electrical wires are carried through said support member and into the internal cavity of said body, said electrical wires providing electricity to said electrical device via one or more of said sealable apertures.

16. The mounting assembly recited in claim 11, wherein said first side, said second side, said top surface, said bottom surface and said front face and said back face are all substantially rectangular.

* * * * *